(12) United States Patent
Yuan et al.

(10) Patent No.: US 10,530,517 B2
(45) Date of Patent: Jan. 7, 2020

(54) CHANNEL ADJUSTMENT METHOD, APPARATUS AND SYSTEM

(71) Applicant: ZTE CORPORATION, Shenzhen, Guangdong (CN)

(72) Inventors: Liquan Yuan, Guangdong (CN); Weiliang Zhang, Guangdong (CN); Xingang Huang, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/097,202

(22) PCT Filed: Jun. 21, 2016

(86) PCT No.: PCT/CN2016/086604
§ 371 (c)(1),
(2) Date: Oct. 26, 2018

(87) PCT Pub. No.: WO2017/185505
PCT Pub. Date: Nov. 2, 2017

(65) Prior Publication Data
US 2019/0140763 A1    May 9, 2019

(30) Foreign Application Priority Data

Apr. 26, 2016  (CN) .......................... 2016 1 0266588

(51) Int. Cl.
*H04B 10/00* (2013.01)
*H04J 14/02* (2006.01)
*H04Q 11/00* (2006.01)

(52) U.S. Cl.
CPC ...... *H04J 14/0249* (2013.01); *H04Q 11/0067* (2013.01); *H04Q 2011/0086* (2013.01)

(58) Field of Classification Search
USPC ..................................................... 398/66–73
See application file for complete search history.

(56) References Cited

U.S. PATENT DOCUMENTS 8,160,447 B2 *   4/2012   Tsuge .................. H04L 12/2861
                                                                     398/115
9,621,970 B2 *   4/2017   Griswold ........... H04Q 11/0067
(Continued)

FOREIGN PATENT DOCUMENTS

CN          1925370 A        3/2007
CN        101355387 A        1/2009
(Continued)

OTHER PUBLICATIONS

WIPO, International Search Report dated Dec. 23, 2016.
China Patent Office, first Office action dated Nov. 28, 2018.
China Patent Office, second Office action dated Feb. 27, 2019.

*Primary Examiner* — Agustin Bello
(74) *Attorney, Agent, or Firm* — Li & Cai Intellectual Property (USA) Office

(57) ABSTRACT

A channel adjustment method, apparatus and system. The method includes: an optical line terminal (OLT) receives a channel bonding capability parameter reported by an optical network unit (ONU) and supported by the ONU; the OLT determines a channel bonding capability parameter of a to-be-bonded channel of the ONU according to the channel bonding capability parameter, a serving application of the ONU and/or a data transmission state; and the OLT sends, to the ONU, first bonding control information carrying the channel bonding capability parameter of the to-be-bonded channel of the ONU and used for instructing the ONU to adjust the bonded channel.

16 Claims, 5 Drawing Sheets

(56) References Cited

U.S. PATENT DOCUMENTS

| | | | |
|---|---|---|---|
| 10,110,979 B2* | 10/2018 | Kim | H04Q 11/0067 |
| 10,211,922 B2* | 2/2019 | Mutalik | H04N 7/22 |
| 2004/0202484 A1* | 10/2004 | Shraga | H04J 3/1694 |
| | | | 398/168 |
| 2007/0092256 A1 | 4/2007 | Nozue et al. | |
| 2009/0154471 A1* | 6/2009 | Kim | H04L 12/2856 |
| | | | 370/395.53 |
| 2009/0232498 A1* | 9/2009 | Tsuge | H04L 41/0226 |
| | | | 398/58 |
| 2012/0033967 A1* | 2/2012 | Zheng | H04L 61/2007 |
| | | | 398/45 |
| 2012/0045199 A1* | 2/2012 | Sun | H04Q 11/0067 |
| | | | 398/5 |
| 2012/0072973 A1* | 3/2012 | Gao | H04L 63/0869 |
| | | | 726/5 |
| 2012/0128349 A1* | 5/2012 | Mitsunaga | H04J 14/0247 |
| | | | 398/25 |
| 2014/0186041 A1* | 7/2014 | Shellhammer | H04Q 11/0071 |
| | | | 398/79 |
| 2014/0199070 A1* | 7/2014 | Shellhammer | H04L 5/0046 |
| | | | 398/66 |
| 2014/0248054 A1* | 9/2014 | Wu | H04Q 11/0067 |
| | | | 398/66 |
| 2016/0285556 A1* | 9/2016 | Boyd | H04B 10/27 |
| 2017/0026128 A1* | 1/2017 | Remein | H04L 69/08 |
| 2017/0070295 A1* | 3/2017 | Remein | H04B 10/50 |
| 2017/0117962 A1* | 4/2017 | Bernard | H04B 10/272 |
| 2017/0155982 A1* | 6/2017 | Gao | H04B 10/073 |
| 2017/0155983 A1* | 6/2017 | Detwiler | H04B 10/27 |
| 2017/0223438 A1* | 8/2017 | Detwiler | H04Q 11/0067 |
| 2017/0302379 A1* | 10/2017 | Bernard | H04L 12/2865 |
| 2017/0317779 A1* | 11/2017 | Wu | H04J 14/0232 |
| 2018/0035183 A1* | 2/2018 | Kim | H04Q 11/0067 |
| 2018/0199119 A1* | 7/2018 | Gao | H04J 14/02 |
| 2018/0213308 A1* | 7/2018 | Wu | H04J 3/1694 |
| 2018/0269977 A1* | 9/2018 | Remein | H04B 10/50 |
| 2018/0309517 A1* | 10/2018 | Zheng | H04L 12/4633 |
| 2019/0052940 A1* | 2/2019 | Gao | H04B 10/073 |

FOREIGN PATENT DOCUMENTS

| | | |
|---|---|---|
| CN | 102131130 A | 7/2011 |
| CN | 103220588 A | 7/2013 |
| WO | WO 2012163052 A1 | 12/2012 |

* cited by examiner

CHANNEL ADJUSTMENT METHOD, APPARATUS AND SYSTEM

TECHNICAL FIELD

The present disclosure relates to, but is not limited to, the communication field, in particular, a channel adjustment method, apparatus and system.

BACKGROUND

With the rapid development of broadband services, the user's demand for access network bandwidth has increased significantly. Passive Optical Network (PON) is an important technical approach for user's access. FIG. 1 shows a schematic diagram of a passive optical network system architecture in the related art. As shown in FIG. 1, in a PON system, an Optical Line Terminal (OLT) is connected to an optical splitter through a backbone optical fiber, and the optical splitter is connected to multiple Optical Network Units (ONUs) through a branch optical fiber. Traditional PON technologies, such as Gigabit PON (GPON), Ethernet PON (EPON), 10 Gigabit PON (XG-PON1) and 10 Gbps EPON (10GEPON), adopt Time Division Multiplexing (TDM)/Time Division Multiplexing Access (TDMA) technology. The OLT and the ONU communicate with each other by a wavelength pair. NG-PON2 adopts Time Division Multiplexing & Wavelength Division Multiplexing PON (TDM & WDM PON; TWDM-PON for short). A wavelength dimension and a bandwidth at the OLT are increased, and it is required that each ONU works only at one wavelength. The ONU can select one wavelength for communication by wavelength tuning. IEEE NG-EPON also chooses to use multiple wavelengths to achieve bandwidth extension, and multi-channel bonding technology is proposed to be used to increase the bandwidth. The ONU can support simultaneous communication on multiple channels.

As for the multi-channel bonding, traditional DSL and Ethernet simply perform bonding on multiple physical channels to increase bandwidth, as needed; and generally, after the multi-channel bonding, the number of the channels will not be changed during communication. As for the PON system, the multiple channels of the ONU refers to multiple optical wavelength channels. Under the condition that the optical device itself consumes a large amount of energy, performing bonding simply on multiple physical channels will cause energy consumption. In view of the above problem in the related art, there is currently no effective solution yet.

SUMMARY

The following is the summary of the subject matter that will be described in detail. This summary is not intended to limit the protective scope of the claims.

Embodiments of the present disclosure provide a channel adjustment method, apparatus, and system which can solve at least the problem of the related art that the bonding performed simply on multiple physical channels may lead to large energy consumption.

The embodiments of the present disclosure adopt the following technical solutions.

A channel adjustment method includes: an optical line terminal (OLT) receiving a channel bonding capability parameter reported by an optical network unit (ONU) and supported by the ONU; the OLT determining a channel bonding capability parameter of channels to be bonded of the ONU according to the received channel bonding capability parameter and a service application and/or a data transmission state of the ONU; and the OLT sending to the ONU a first bonding control information for instructing the ONU to adjust bonded channels, wherein the first bonding control information carries the channel bonding capability parameter of the channels to be bonded of the ONU.

Optionally, the channel bonding capability parameter includes at least one of: the number of the bonded channels, a wavelength of the bonded channels, and uplink and downlink rates of the channels.

Optionally, after the OLT sending to the ONU the first bonding control information for instructing the ONU to adjust bonded channels, the method further includes: the OLT receiving a request reported by the ONU for instructing to change channels having been bonded; and the OLT changing the channels having been bonded according to the channel bonding capability parameter and the service application and/or the data transmission state of the ONU, and sending to the ONU a second bonding control information for instructing the ONU to change bonded channels, wherein the second bonding control information carries a changed channel bonding capability parameter.

Optionally, after the OLT sending to the ONU the first bonding control information for instructing the ONU to adjust bonded channels, the method further includes: the OLT sending to the ONU a request for instructing to change channels having been bonded; the OLT receiving a message from the ONU for responding to the request, wherein the message for responding to the request indicates that the ONU confirms to perform an operation of changing the channels having been bonded; and the OLT changing the channels having been bonded according to the channel bonding capability parameter and the service application and/or the data transmission state of the ONU, and sending to the ONU a third bonding control information for instructing the ONU to change bonded channels, wherein the third bonding control information carries a changed channel bonding capability parameter.

A channel adjustment method includes: an optical network unit (ONU) reporting to an optical line terminal (OLT) a channel bonding capability parameter supported by the ONU; and the ONU receiving a first bonding control information sent by the OLT for instructing the ONU to adjust bonded channels, wherein the first bonding control information carries a channel bonding capability parameter of channels to be bonded of the ONU, and the channel bonding capability parameter of the channels to be bonded of the ONU is determined by the OLT according to the channel bonding capability parameter reported by the ONU and a service application and/or a data transmission state of the ONU.

Optionally, the channel bonding capability parameter includes at least one of: the number of the bonded channels, a wavelength of the bonded channels, and uplink and downlink rates of the channels.

Optionally, after the ONU receiving the first bonding control information sent by the OLT for instructing the ONU to adjust bonded channels, the method further includes: the ONU reporting to the OLT a request for instructing to change channels having been bonded; and the ONU receiving a second bonding control information sent by the OLT for instructing the ONU to change bonded channels, wherein the second bonding control information carries a changed channel bonding capability parameter, and the changed channel bonding capability parameter is determined through the OLT changing the channels having been bonded according to the channel bonding capability parameter and the service application and/or the data transmission state of the ONU.

Optionally, after the ONU receiving the first bonding control information sent by the OLT for instructing the ONU to adjust bonded channels, the method further includes: the ONU receiving a request sent by the OLT for instructing to change channels having been bonded; the ONU sending a message to the OLT for responding to the request, wherein the message for responding to the request indicates that the ONU confirms to perform an operation of changing the channels having been bonded; and the ONU receiving a third bonding control information sent by the OLT for instructing the ONU to change bonded channels, wherein the third bonding control information carries a changed channel bonding capability parameter, and the changed channel bonding capability parameter is determined through the OLT changing the channels having been bonded according to the channel bonding capability parameter and the service application and/or the data transmission state of the ONU.

A channel adjustment apparatus applied at an optical line terminal (OLT) includes: a first receiving module configured to receive a channel bonding capability parameter reported by an optical network unit (ONU) and supported by the ONU; a determining module configured to determine a channel bonding capability parameter of channels to be bonded of the ONU according to the received channel bonding capability parameter and a service application and/or a data transmission state of the ONU; and a first sending module configured to send to the ONU a first bonding control information for instructing the ONU to adjust bonded channels, wherein the first bonding control information carries the channel bonding capability parameter of the channels to be bonded of the ONU.

Optionally, the channel bonding capability parameter includes at least one of: the number of the bonded channels, a wavelength of the bonded channels, and uplink and downlink rates of the channels.

Optionally, the first receiving module is further configured to receive, after the first sending module sends to the ONU the first bonding control information for instructing the ONU to adjust bonded channels, a request reported by the ONU for instructing to change channels having been bonded; and the apparatus further includes a first processing module configured to change the channels having been bonded according to the channel bonding capability parameter and the service application and/or the data transmission state of the ONU, and send a second bonding control information to the ONU for instructing the ONU to change bonded channels, wherein the second bonding control information carries a changed channel bonding capability parameter.

Optionally, the first sending module is further configured to send, after sending to the ONU the first bonding control information for instructing the ONU to adjust bonded channels, a request to the ONU for instructing to change channels having been bonded; the first receiving module is further configured to receive a message from the ONU for responding to the request, wherein the message for responding to the request indicates that the ONU confirms to perform an operation of changing the channels having been bonded; and the apparatus further includes a second processing module configured to change the channels having been bonded according to the channel bonding capability parameter and the service application and/or the data transmission state of the ONU, and send a third bonding control information to the ONU for instructing the ONU to change bonded channels, wherein the third bonding control information carries a changed channel bonding capability parameter.

A channel adjustment apparatus applied at an optical network unit (ONU) includes: a first reporting module configured to report to an optical line terminal (OLT) a channel bonding capability parameter supported by the ONU; and a second receiving module configured to receive a first bonding control information sent by the OLT for instructing the ONU to adjust bonded channels, wherein the first bonding control information carries a channel bonding capability parameter of channels to be bonded of the ONU, and the channel bonding capability parameter of the channels to be bonded of the ONU is determined by the OLT according to the channel bonding capability parameter reported by the ONU and a service application and/or a data transmission state of the ONU.

Optionally, the channel bonding capability parameter includes at least one of: the number of the bonded channels, a wavelength of the bonded channels, and uplink and downlink rates of the channels.

Optionally, the first reporting module is further configured to report, after the second receiving module receives the first bonding control information sent by the OLT for instructing the ONU to adjust bonded channels, a request to the OLT for instructing to change channels having been bonded; and the second receiving module is further configured to receive a second bonding control information sent by the OLT for instructing the ONU to change bonded channels, wherein the second bonding control information carries a changed channel bonding capability parameter, and the changed channel bonding capability parameter is determined through the OLT changing the channels having been bonded according to the channel bonding capability parameter and the service application and/or the data transmission state of the ONU.

Optionally, the second receiving module is further configured to receive, after receiving the first bonding control information sent by the OLT for instructing the ONU to adjust bonded channels, a request sent by the OLT for instructing to change channels having been bonded; the apparatus further includes a second sending module configured to send a message to the OLT for responding to the request, wherein the message for responding to the request indicates that the ONU confirms to perform an operation of changing the channels having been bonded; and the second receiving module is further configured to receive a third bonding control information sent by the OLT for instructing the ONU to change bonded channels, wherein the third bonding control information carries a changed channel bonding capability parameter, and the changed channel bonding capability parameter is determined through the OLT changing the channels having been bonded according to the channel bonding capability parameter and the service application and/or the data transmission state of the ONU.

A channel adjustment system includes the channel adjustment apparatus according to the embodiments of the present disclosure.

A storage medium storing program codes for carrying out the steps of the methods according to the embodiments of the present disclosure.

According to the embodiments of the present disclosure, the OLT and the ONU cooperate with each other to achieve the bonding of multiple optical channels between the OLT and the ONU flexibly according to a related channel bonding capability parameter and a service application and/or a data transmission state of the ONU, thereby solving the problem of the related art that the bonding performed simply on multiple physical channels may lead to large energy consumption.

Other aspects may be apparent after the drawings and the detailed descriptions are read and understood.

DETAILED DESCRIPTION

It should be noted that the embodiments and the features in the embodiments of the present application may be combined as long as they do not conflict with each other.

It should be noted that the terms "first", "second", etc. recited in the specification, the claims and the drawings are only used to distinguish one element from another, and should not be used to describe a specific sequence or an order.

Figure 1:
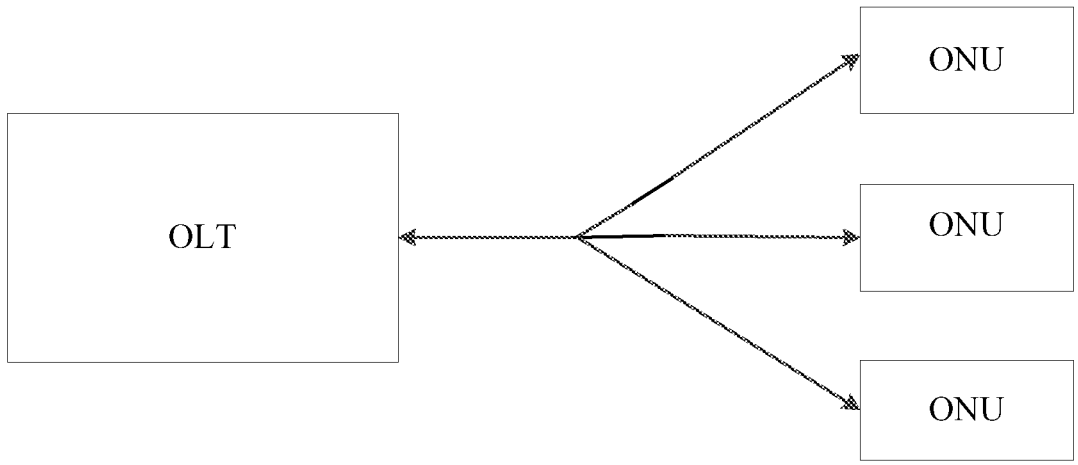
FIG. 1 is a schematic diagram of a passive optical network system architecture in the related art.
Figure 2:
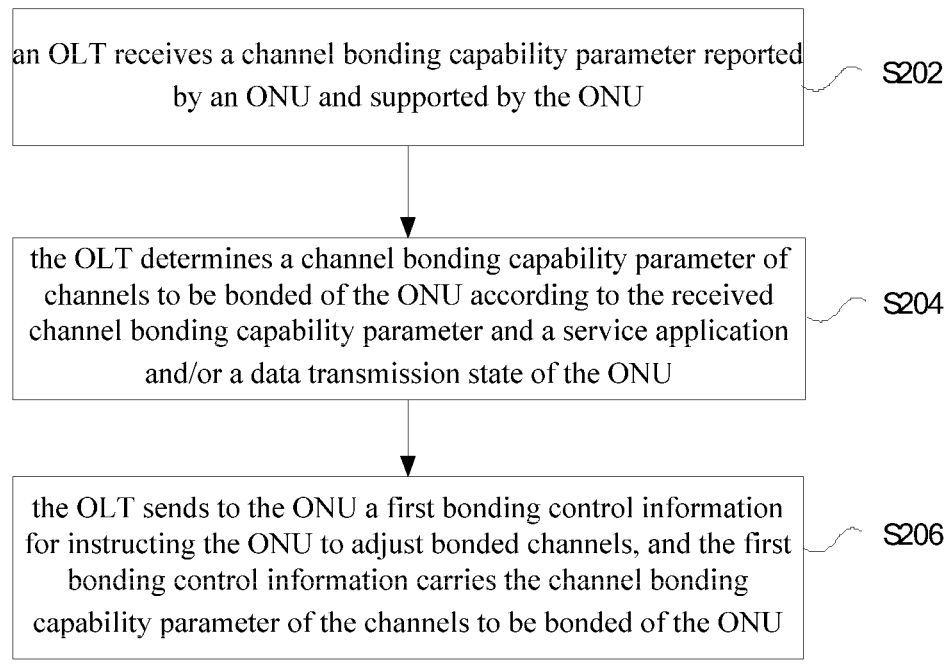
FIG. 2 is a flow chart of a channel adjustment method according to an embodiment of the present disclosure.

An embodiment of the present disclosure provides a channel adjustment method. FIG. 2 is a flow chart of a channel adjustment method according to an embodiment of the present disclosure. As shown in FIG. 2, the flow includes the following steps S202 to S206.

At step S202, an optical line terminal (OLT) receives a channel bonding capability parameter reported by an optical network unit (ONU) and supported by the ONU.

At step S204, the OLT determines a channel bonding capability parameter of channels to be bonded of the ONU according to the received channel bonding capability parameter and a service application and/or a data transmission state of the ONU.

At step 206, the OLT sends to the ONU a first bonding control information for instructing the ONU to adjust bonded channels, and the first bonding control information carries the channel bonding capability parameter of the channels to be bonded of the ONU.

With the steps S202 to S206 in the present embodiment, the OLT determines the channel bonding capability parameter of the channels to be bonded of the ONU according to the received channel bonding capability parameter and the service application and/or the data transmission state of the ONU, and sends to the ONU the first bonding control information for instructing the ONU to adjust the bonded channels. That is to say, the bonding of multiple optical channels between the OLT and the ONU is achieved flexibly by the cooperation between the OLT and the ONU according to a related channel bonding capability parameter and a service application and/or a data transmission state of the ONU, thereby solving the problem of the related art that the bonding performed simply on multiple physical channels may lead to large energy consumption.

Optionally, the channel bonding capability parameter involved in the present embodiment may include at least one of: the number of the bonded channels, the wavelength of the bonded channels, and uplink and downlink rates of the channels. Obviously, the above parameters are just optional parameters, and should not be considered as a limitation of the present embodiment.

In an optional implementation of the present embodiment, after the OLT involved in the step S206 sends the first banding control information to the ONU for instructing the ONU to adjust the bonded channels, the method of the present embodiment further includes steps S208 to S210.

At step S208, the OLT receives a request reported by the ONU for instructing to change channels having been bonded.

At step S210, the OLT changes the channels having been bonded according to the channel bonding capability parameter and the service application and/or the data transmission state of the ONU, and sends a second bonding control information to the ONU for instructing the ONU to change bonded channels, wherein the second bonding control information carries a changed channel bonding capability parameter.

In an optional implementation of the present embodiment, after the OLT involved in the step S206 sends the first banding control information to the ONU for instructing the ONU to adjust the bonded channels, the method of the present embodiment further includes steps S212 to S216.

At step S212, the OLT sends to the ONU a request for instructing to change channels having been bonded.

At step S214, the OLT receives a message from the ONU for responding to the request (i.e., the request for instructing to change the channels having been bonded), wherein the message for responding to the request indicates that the ONU confirms to perform an operation of changing the channels having been bonded.

At step S216, the OLT changes the channels having been bonded according to the channel bonding capability parameter and the service application and/or the data transmission state of the ONU, and sends a third bonding control information to the ONU for instructing the ONU to change bonded channels, wherein the third bonding control information carries a changed channel bonding capability parameter.

For the above steps S208 to S210 and S212 to S216, it can be seen that, even if the ONU has determined bonded channels, the bonded channels can be changed later. There are two ways to change the bonded channels: one is reporting, by the ONU itself, a request that the bonded channels need to change, which corresponds to the way as involved in the steps S208 to S210; the other is issuing, by the OLT, a request for changing the bonded channels to the ONU, which corresponds to the way as involved in the steps S212 and S216.

It should be noted that, the embodiment of FIG. 2 is described from a perspective of the OLT0; next, the present disclosure will be described from a perspective of the ONU, which is an opposite side of the OLT.

Figure 3:
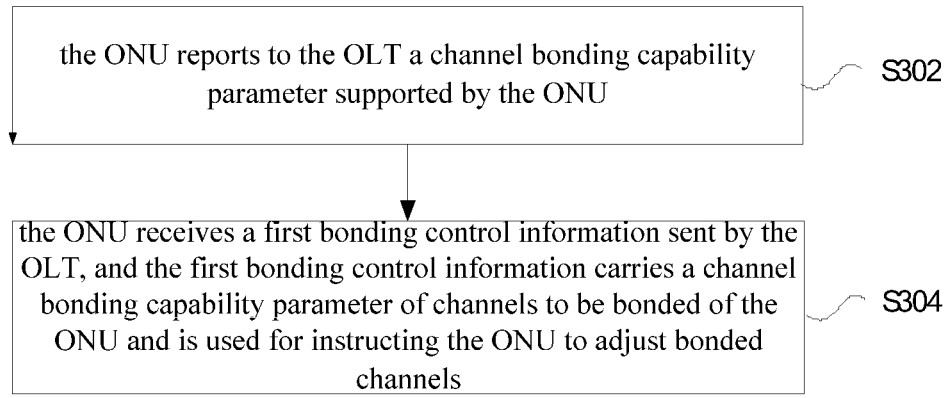
FIG. 3 is a flow chart of a channel adjustment method according to another embodiment of the present disclosure.

FIG. 3 is a flow chart of a channel adjustment method according to another embodiment of the present disclosure. As shown in FIG. 3, the method includes steps S302 to S304.

At step S302, an optical network unit (ONU) reports to an optical line terminal (OLT) a channel bonding capability parameter which is supported by the ONU.

At step S304, the ONU receives a first bonding control information sent by the OLT for instructing the ONU to adjust bonded channels, wherein the first bonding control information carries a channel bonding capability parameter of channels to be bonded of the ONU, and the channel bonding capability parameter of the channels to be bonded of the ONU is determined by the OLT according to the channel bonding capability parameter reported by the ONU and a service application and/or a data transmission state of the ONU.

Optionally, the channel bonding capability parameter as involved in the above step S304 is consistent with that involved in the embodiment of FIG. 2.

In an optional implementation of the present embodiment, after the ONU involved in the step S304 receives the first bonding control information sent by the OLT for instructing the ONU to adjust the bonded channels, the method of the present embodiment further includes steps S306 to S308.

At step S306, the ONU reports to the OLT a request for instructing to change channels having been bonded.

At step S308, the ONU receives a second bonding control information sent by the OLT for instructing the ONU to change bonded channels, wherein the second bonding control information carries a changed channel bonding capability parameter, and the changed channel bonding capability parameter is determined through the OLT changing the channels having been bonded according to the channel bonding capability parameter and the service application and/or the data transmission state of the ONU.

In another optional implementation of the present embodiment, after the ONU involved in the step S304 receives the first bonding control information sent by the OLT for instructing the ONU to adjust the bonded channels, the method of the present embodiment may further include steps S310 to S314.

At step S310, the ONU receives a request sent by the OLT for instructing to change channels having been bonded.

At step S312, the ONU sends a message to the OLT for responding to the request, wherein the message for responding to the request indicates that the ONU confirms to perform an operation of changing the channels having been bonded.

At step S314, the ONU receives a third bonding control information sent by the OLT for instructing the ONU to change bonded channels, wherein the third bonding control information carries a changed channel bonding capability parameter, and the changed channel bonding capability parameter is determined through the OLT changing the channels having been bonded according to the channel bonding capability parameter and the service application and/or the data transmission state of the ONU.

With the descriptions of the above embodiments, those skilled in the art can clearly understand that the method according to the above embodiment can be implemented by means of a combination of software and a necessary general hardware platform, and, obviously, can also be implemented by hardware; however, the former is a more general implementation in many cases. Based on such understanding, the essence of the technical solution of the present disclosure (or in other words, the contribution of the present disclosure to the related art) can be embodied in the form of a software product which may be stored in a storage medium (such as a ROM/RAM, a magnetic disk, a compact disk, and the like), and include one or more instructions for causing a terminal device (which may be a mobile, a computer, a server, or a network device, etc.) to perform the method described in the embodiment of the present disclosure.

An embodiment of the present disclosure provides a channel adjustment apparatus. The apparatus is provided to achieve the above embodiments and optional implementations, and the descriptions having been made will not be repeated here. As used hereinafter, the term "module" may be a combination of software and/or hardware capable of achieving a predetermined function. Although it is preferred to implement the apparatus as described in the embodiment below by software, it is possible to conceive an implementation of hardware or a combination of software and hardware.

Figure 4:
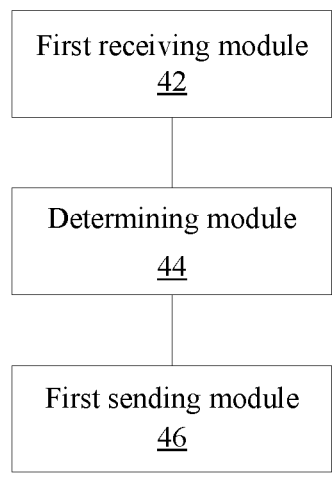
FIG. 4 is a structural block diagram of a channel adjustment apparatus according to an embodiment of the present disclosure.

FIG. 4 is a structural block diagram of a channel adjustment apparatus according to an embodiment of the present disclosure, which is applied at an optical line terminal (OLT). As shown in FIG. 4, the apparatus includes: a first receiving module 42 configured to receive a channel bonding capability parameter reported by an optical network unit (ONU) and supported by the ONU; a determining module 44 coupled with the first receiving module 42 and configured to determine a channel bonding capability parameter of channels to be bonded of the ONU according to the received channel bonding capability parameter and a service application and/or a data transmission state of the ONU; and a first sending module 46 coupled with the determining module 44 and configured to send to the ONU a first bonding control information for instructing the ONU to adjust the bonded channels, wherein the first bonding control information carries the channel bonding capability parameter of the channels to be bonded of the ONU.

Optionally, the channel bonding capability parameter includes at least one of: the number of the bonded channels, the wavelength of the bonded channels, and uplink and downlink rates of the channels.

Optionally, in the present embodiment, the first receiving module 42 is further configured to receive, after the OLT sends to the ONU the first bonding control information for instructing the ONU to adjust the bonded channels, a request reported by the ONU for instructing to change channels having been bonded.

The apparatus further includes a first processing module configured to change the channels having been bonded according to the channel bonding capability parameter and the service application and/or the data transmission state of the ONU, and send a second bonding control information to the ONU for instructing the ONU to change the bonded channels, wherein the second bonding control information carries a changed channel bonding capability parameter.

Optionally, in the present embodiment, the first sending module 46 is further configured to send, after sending to the ONU the first bonding control information for instructing the ONU to adjust the bonded channels, a request to the ONU for instructing to change channels having been bonded. and the first receiving module 42 is further configured to receive a message from the ONU for responding to the request, wherein the message for responding to the request indicates that the ONU confirms to perform an operation of changing the channels having been bonded. The apparatus further includes a second processing module configured to change the channels having been bonded according to the channel bonding capability parameter and the service application and/or the data transmission state of the ONU, and send a third bonding control information to the ONU for instructing the ONU to change the bonded channels, wherein the third bonding control information carries a changed channel bonding capability parameter.

Figure 5:
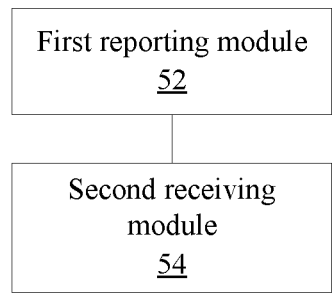
FIG. 5 is a structural block diagram of a channel adjustment apparatus according to another embodiment of the present disclosure.

FIG. 5 is a structural block diagram of a channel adjustment apparatus according to another embodiment of the present disclosure, which is applied at an optical network unit (ONU). As shown in FIG. 5, the apparatus includes: a first reporting module 52 configured to report to an optical line terminal (OLT) a channel bonding capability parameter supported by the ONU; and a second receiving module 54 coupled with the first reporting module 52 and configured to receive a first bonding control information sent by the OLT for instructing the ONU to adjust the bonded channels, wherein the first bonding control information carries a channel bonding capability parameter of the channels to be bonded of the ONU, and the channel bonding capability parameter of the channels to be bonded of the ONU is determined by the OLT according to the channel bonding capability parameter reported by the ONU and a service application and/or a data transmission state of the ONU.

Optionally, the channel bonding capability parameter includes at least one of: the number of the bonded channels, the wavelength of the bonded channels, and uplink and downlink rates of the channels.

In the present embodiment, optionally, the first reporting module 52 is further configured to report, after the second receiving module 54 receives the first bonding control information sent by the OLT for instructing the ONU to adjust the bonded channels, a request to the OLT for instructing to change channels having been bonded, and the second receiving module 54 is further configured to receive a second bonding control information sent by the OLT for instructing the ONU to change the bonded channels, wherein the second bonding control information carries a changed channel bonding capability parameter, and the changed channel bonding capability parameter is determined through the OLT changing the channels having been bonded according to the channel bonding capability parameter and the service application and/or the data transmission state of the ONU.

Optionally, in the present embodiment, the second receiving module 52 is further configured to receive, after receiving the first bonding control information sent by the OLT for instructing the ONU to adjust the bonded channels, a request sent by the OLT for instructing to change channels having been bonded.

The apparatus further includes a second sending module configured to send a message to the OLT for responding to the request, wherein the message for responding to the request indicates that the ONU confirms to perform an operation of changing the channels having been bonded, and the second receiving module 54 is further configured to receive a third bonding control information sent by the OLT for instructing the ONU to change the bonded channels, wherein the third bonding control information carries a changed channel bonding capability parameter, and the changed channel bonding capability parameter is determined through the OLT changing the channels having been bonded according to the channel bonding capability parameter and the service application and/or the data transmission state of the ONU.

Figure 6:
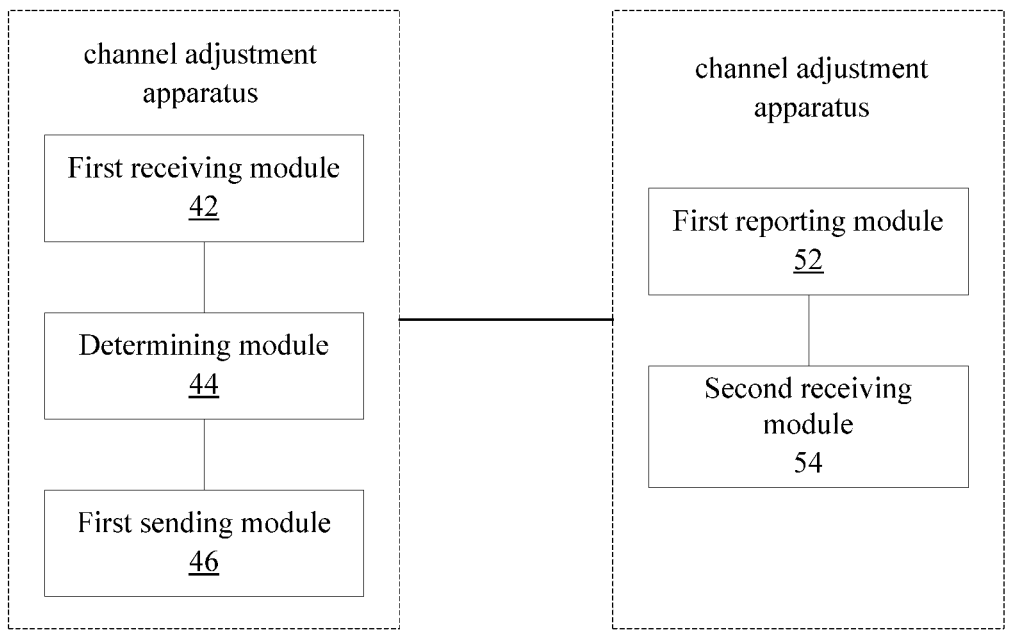
FIG. 6 is a structural diagram of a channel adjustment system according to an embodiment of the present disclosure.

FIG. 6 is a structural diagram of a channel adjustment system according to an embodiment of the present disclosure. As shown in FIG. 6, the system includes the channel adjustment apparatus involved in FIG. 4 and the channel adjustment apparatus involved in FIG. 5.

It should be noted that, the above modules may be implemented by software or hardware; if they are implemented by hardware, they may be implemented by, but not limited to, the followings manners: the above modules are located in a same processor; or, the above modules are located respectively in different processors in any combination.

An embodiment of the present disclosure provides a multi-channel data transmission method and apparatus for a passive optical network.

The data transmission method provided in this embodiment is applied to an optical network unit (ONU). The ONU communicates with an optical line terminal (OLT) via multiple transmission paths. The number of channels connected by different ONUs may be different. As for an OLT and an ONU which are connected to multiple channels, how to use the multiple channels to achieve an effective usage thereof and to achieve energy saving of the ONU should be considered. In this embodiment, a step of flexibly bonding, by the OLT, the multiple channels supported by the ONU may include steps S402 to S414.

At step S402, the OLT receives a bonding capability parameter reported by the ONU and supported by the ONU. The capability parameter includes at least one of: the number of the bonded channels, the wavelength of the bonded channels, and uplink and downlink rates of the channels, etc.

At step S404, the OLT determines the bonded channels of the ONU according to the bonding capability parameter of the ONU and the service application or the data transmission state of the ONU, and sends bonding control information to the ONU.

At step S406, the ONU receives the bonding control information and adjusts the bonded channels.

The ONU reports the bonding capability parameter supported by the ONU during initialization. The ONU reports the bonding capability parameter of the ONU via any one or more of the multiple transmission paths. The OLT sends the bonding control information to the ONU according to the bonding capability parameter reported by the ONU. The control information includes at least one of: the number of the bonded channels, the wavelength of the bonded channels, and uplink and downlink rates of the channels, etc.

At step S408, the bonding is completed and a bonded set is established after the OLT receiving bonding confirming information from the ONU.

At step S410, the OLT may change the bonded set after the OLT receiving a request for changing the bonded set sent by the ONU. The information to be changed may include at least one of: the number of the bonded channels, the wavelength of the bonded channels, and uplink and downlink rates of the channels, etc. The data from OLT to the ONU is transmitted on the bonded channels of the bonded set.

At step S412, the ONU should replay whether it accepts the bonding control request after receiving the bonding control information, and if it accepts, the bonded set is established or changed.

At step S414, the OLT itself may issue adjustment control information of the bonded set, and if the ONU agrees to change, the bonding is changed successfully.

Based on the above multi-channel data transmission method for a passive optional network, the present embodiment further provides an OLT device and an ONU device.

The OLT device includes a first bonding control module and a first data forwarding control module.

The first bonding control module is configured to receive a bonding capability parameter reported by the ONU, send bonding control information to the ONU and confirm, according to the message reported by the ONU, the establishment of the bonded set, wherein the control information includes at least one of: the number of the bonded channels, the wavelength of the bonded channels, and uplink and downlink rates of the channels, etc.

The first data forwarding control module is configured to determine, according to the information of the bonded set such as the number of the bonded channels, the wavelength of the bonded channels, and uplink and downlink rates of the channels, etc., a data distribution method of the bonded set down linked from the OLT to the ONU and a data sending window of the uplink data of the ONU.

Moreover, the first bonding control module may be further configured to change the bonded set after receiving a request for changing the bonded set sent by the ONU. The information to be changed includes at least one of: the number of the bonded channels, the wavelength of the bonded channels, and uplink and downlink rates of the channels, etc.

Accordingly, the data of the ONU changed by the first data forwarding control module is transmitted on the bonded channels of the changed bonded set.

The ONU device in the present embodiment includes: a second bonding control module and a second data forwarding control module.

The second bonding control module is configured to report a bonding capability parameter of the ONU, receive bonding control information sent by the OLT, and report information for confirming the establishment of a bonded set.

The second forwarding control module is configured to receiving data sending window information of uplink data of the ONU sent by the first data forwarding control module, and transmit data according to the window information.

The ONU may report the bonding capability information of the ONU in the information format and mechanism of MPCP or PLOAM at the time of registration. During the operating, in order to control the bonded set, the OLT and the ONU send messages in the information format and mechanism of MPCP or PLOAM.

After the bonded set is changed, the second data forwarding control module ensures that the data of the ONUs under a same ODN does not conflict, by sending corresponding bandwidth control messages.

After the bonded channels of the ONU are reduced, the ONU shuts down the receiving and sending of the optical modules of the channels which are not in the bonded set.

According to the solution of the present embodiment, in the passive optical network system, the data between the OLT and the ONU may be transmitted via multiple transmission paths which are independent of each other. The transmission path for the data is optional during the transmission. Each transmission path can transmit the same or different data. These transmission paths are coordinated by the collaboration of the OLT and the ONU so as to become a path group with a larger capacity, thereby improving the bandwidth between the OLT and the ONU and increasing the network capacity of the passive optical network.

Figure 7:
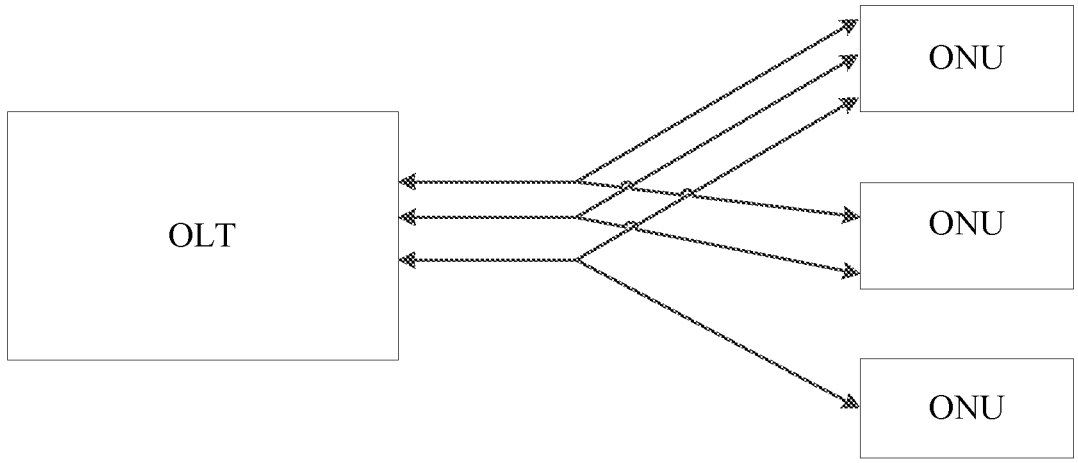
FIG. 7 is a schematic diagram of a passive optical network system architecture supporting multi-channel bonding according to an embodiment of the present disclosure.

FIG. 7 is a schematic diagram of a passive optical network system architecture supporting multi-channel bonding according to an embodiment of the present disclosure. As shown in FIG. 7, the OLT and the multiple bonded ONU may be connected by multiple channels.

Figure 8:
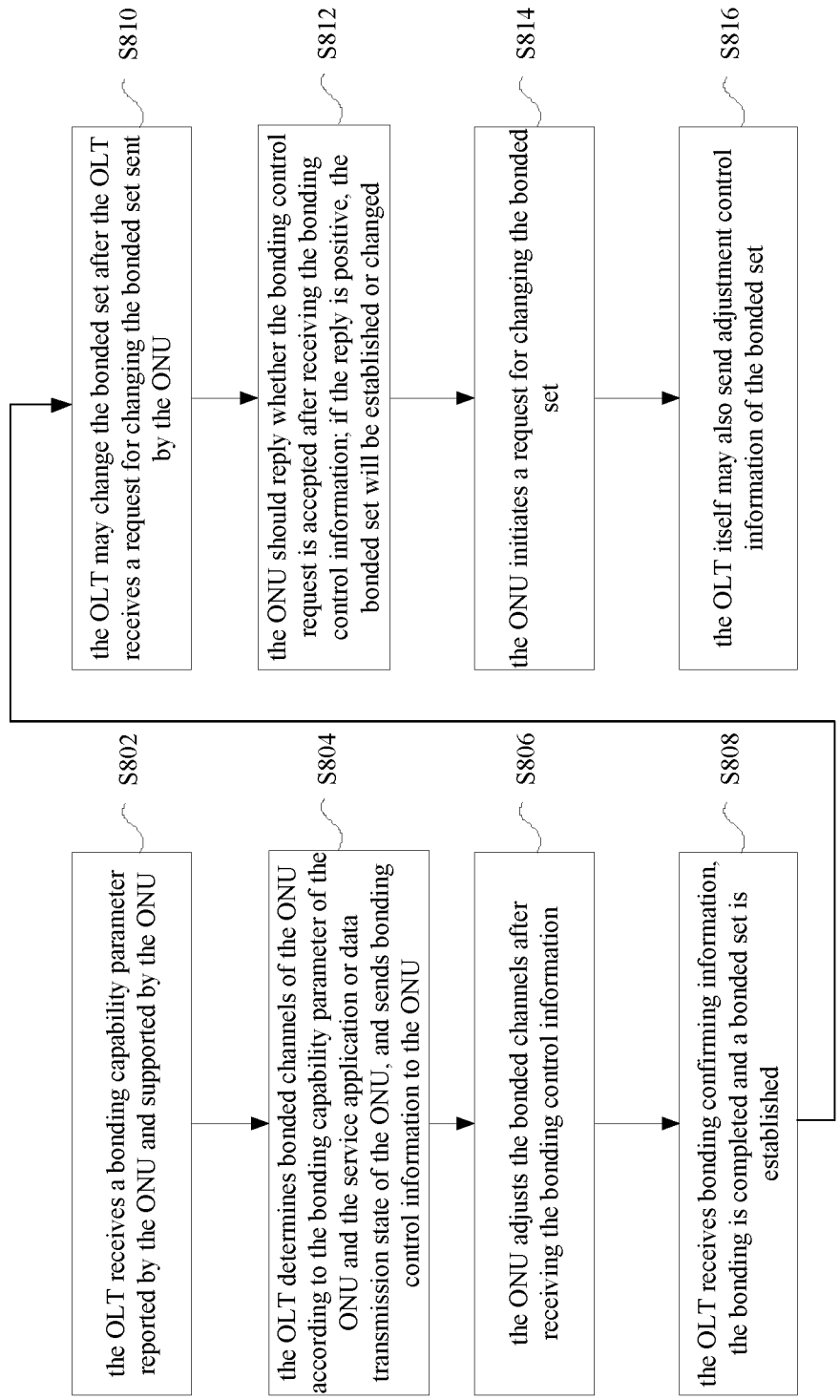
FIG. 8 is a flow chart of a multi-channel bonding data transmission method according to an embodiment of the present disclosure.

In order to achieve the above purpose, FIG. 8 is a flow chart of a multi-channel bonding data transmission method according to an embodiment of the present disclosure. As shown in FIG. 8, the method includes steps S802 to S818.

At step S802, the OLT receives a bonding capability parameter reported by the ONU which is supported by the ONU.

The capability parameter includes at least one of: the number of the bonded channels, the wavelength of the bonded channels, and uplink and downlink rates of the channels, etc.

At step S804, the OLT determines bonded channels of the ONU according to the bonding capability parameter of the ONU and the service application or data transmission state of the ONU, and sends bonding control information to the ONU.

At step S806, the ONU adjusts the bonded channels after receiving the bonding control information.

The ONU reports the bonding capability parameter supported by the ONU during initialization. The ONU reports the bonding capability parameter of the ONU via any one or more of the multiple transmission paths. For instance, the ONU supports the bonding of four transmission paths; the downlink wavelength of each transmission path starts from 1330 nm as the center wavelength and the uplink wavelength starts from 1280 nm; the band spacing between the transmission paths is 400 Ghz; the uplink transmission rate is 10 Gbps, and the downlink transmission rate is 25 Gbps. In this case, the ONU may select the first transmission path to report the bonding capability parameter, that is, to report the bonding capability at the wavelength of 1280 nm: there are 4 transmission paths, the uplink wavelength starts from 1280 nm, the channel spacing is 400 Ghz, and the rate of the corresponding wavelength is 10 G/25 G bps. The rate of the corresponding wavelength may be different for each transmission path. For example, the first wavelength supports a rate of 10 G/25 G bps, and the other wavelengths support the uplink and downlink rates of 25 G/25 G bps. The OLT sends the bonding control information to the ONU according to the bonding capability parameter reported by the ONU. The bonding control information includes at least one of the following: the number of the bonded channels, the wavelength of the channels, and the uplink and downlink rates, etc. The number of the bonded channels might be different from that reported by the ONU. For example, although the reported number of the channels which can be supported is 4, the OLT binds only two channels according to the services requested by the user corresponding to the ONU. If the number of the channels which are bonded is smaller than the supported bonded-channel number, the wavelength of the channels may be notified, or an appointment that the channel wavelength is calculated from 1 wavelength may be made. If the uplink and downlink rates are adjustable, the uplink and downlink rates may be notified when a notification is issued.

At step S808, the bonding is completed and a bonded set is established after the OLT receiving bonding confirming information from the ONU;

If the bonding is successful, the ONU sends information for confirming the success of the bonding. Thereafter, the data that is forwarded by the OLT to the ONU during the operating will be transmitted on the bonded channels after the bonding is completed.

In a case that a user submits an application for changing the bandwidth during the initialization or operating, the OLT may initiate an application to change the bonded set, may increase the bonded channels, or may reduce the bonded channels. During the operating, the data transmission state of the user is variable; for example, the user goes to work and does not use the broadband services during the day, while he/she uses the broadband at night intensively. In order to save energy consumption, the OLT and ONU supporting the data channel bonding may enter an energy saving mode and set the thresholds for entering and exiting the energy saving mode. When the ONU or the OLT determines, by detecting the data traffic information, that the data traffic is smaller than the set threshold of entering the energy saving mode, the OLT or the ONU supporting the data channel bonding may initiate a request for changing the bonded channels and enter the energy saving mode. On the other hand, when the ONU or the OLT determines, by detecting the data traffic information, that the data traffic is larger than the set threshold of existing the energy saving mode, the OLT or the ONU may initiate a request for changing the bonded channels and exit the energy saving mode.

At step S810, the OLT may change the bonded set after the OLT receives a request for changing the bonded set sent by the ONU.

The information to be changed may include at least one of the following: the number of the bonded channels, the wavelength of the channels, and the uplink and downlink rates, etc. The data from the OLT to the ONU will be transmitted on the bonded channels of the changed bonded set.

At step S812, the ONU should reply whether the bonding control request is accepted after receiving the bonding control information; if the reply is positive, the bonded set will be established or changed.

At step S814, the ONU initiates a request for changing the bonded set.

The request may be initiated in a case that there is a change in the corresponding operating condition, such as the reduces data traffic. In order to save energy, the optical receiving/sending modules of a certain channel or certain channels may be turned off.

At step S816: the OLT itself may also send bonding control information to adjust the bonded set.

If the ONU agrees to change, the bonding is changed successfully.

At step S818, after receiving the bonding control information, the ONU will change one or more of the following: the number of the bonded channels, the wavelength of the channel, the uplink and downlink rates, etc.

The above steps S810 to S816 may be performed in no particular order.

The information such as the wavelengths of the channels, the uplink and downlink rates, and so on are used to control several or all channels to form a bonded set. If the number of the bonded channels is less than the supported number of the bonded channels, the optical receiving/sending modules of other channels need to be turned off. The corresponding data processing modules may be turned off for further energy saving. If there is a need to make a change, the energy saving mode is exited, and the ONU needs to turn on the optical receiving/sending modules of the corresponding modules and resume the data receiving and sending.

Figure 9:
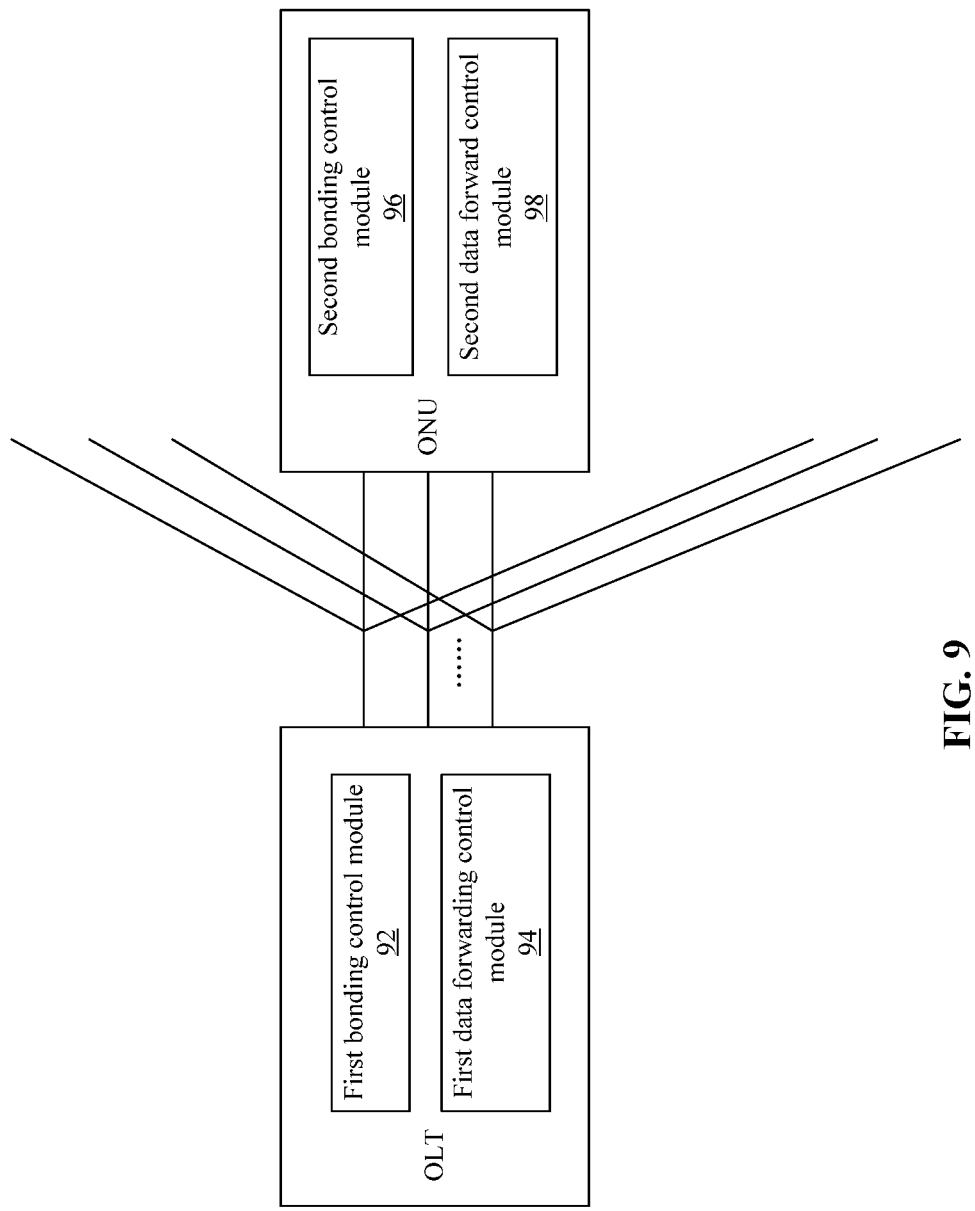
FIG. 9 is a structural diagram of the OLT and the ONU devices of the multi-channel bonding data transmission according to an embodiment of the present disclosure.

In order to achieve the purpose of establishing a bonded set flexibly, FIG. 9 is a structural diagram of the OLT and the ONU devices of the multi-channel bonding data transmission according to an embodiment of the present disclosure. As shown in FIG. 9, the OLT includes a first bonding control module 92 and a first data forwarding control module 94.

The first bonding control module 92 is configured to receive a bonding capability parameter reported by the ONU, send bonding control information to the ONU, and confirm, according to the message reported by the ONU, the establishment of a bonded set, wherein the control information includes at least one of the following: the number of the bonded channels, the wavelength of the channels, the uplink and downlink rates, etc.

The first data forwarding control module 94 is configured to determine, according to the information of the bonded set such as the number of the bonded channels, the wavelength of the bonded channels, and uplink and downlink rates of the channels, etc., a data distribution method of the bonded set down linked from the OLT to the ONU and a data sending window of the uplink data of the ONU.

Moreover, the first bonding control module 92 may be further configured to change the bonded set after receiving a request for changing the bonded set sent by the ONU. The information to be changed includes at least one of: the number of the bonded channels, the wavelength of the bonded channels, and uplink and downlink rates of the channels, etc.

Additionally, the data of the ONU changed by the first data forwarding control module 94 is transmitted on the bonded channels of the changed bonded set.

The ONU device in the present embodiment includes a second bonding control module 96 and a second data forwarding control module 98.

The second bonding control module 96 is configured to report a bonding capability parameter of the ONU, receive bonding control information sent by the OLT, and report information for confirming the establishment of a bonded set.

The second data forwarding control module 98 is configured to receiving data sending window information of uplink data of the ONU sent by the first data forwarding control module 94, and transmit data according to the window information.

In order to ensure the interactive bonding capability between the OLT and the ONU and the bonding control information, the MPCP of the NG-EPON system or the PLOAM message of the NG-PON2 system may be used for information interaction in an optional implementation of the present embodiment. Other messages such as the extended OAM or the OMCI may also be used.

In order that the ONU reports the bonding capability information during registration, in the NG-EPON system, the message format and mechanism of the MPCP are used for sending a message; for the NG-PON2 system, the message format and mechanism of the PLOAM may be used for sending a message.

Based on this, when controlling the bonded set during the working, in the NG-EPON system, the message format and mechanism of the MPCP or OAM or extended OAM are used for sending a message; in the NG-PON2 system, the message format and mechanism of the PLOAM or OMCI may be used for sending a message.

As for the ONU which has changed the bonded set, the number of channels between the OLT and the ONU changes, and the first data forwarding control module 94 of the OLT may send a corresponding bandwidth control message to the second data forwarding control module 98 of the ONU, thereby controlling the data sending window of each channel of the changed bonded set to ensure that the data of the ONU under the same ODN does not conflict with each other.

After the bonded channels of the ONU are reduced, the ONU may shut down the receiving and sending of the optical modules of the corresponding channels which are not in the bonded set, thereby reducing energy consumption and further reducing the requirements of the corresponding back-end data processing component.

An embodiment of the present disclosure further provides a storage medium. Optionally, in the present embodiment, the storage medium may be configured to store program codes for performing the following steps.

Step S1, an optical line terminal (OLT) receives a channel bonding capability parameter reported by an optical network unit (ONU) and supported by the ONU.

Step S2, the OLT determines a channel bonding capability parameter of channels to be bonded of the ONU according to the received channel bonding capability parameter and a service application and/or a data transmission state of the ONU.

Step S3, the OLT sends to the ONU a first bonding control information which carries the channel bonding capability parameter of the channels to be bonded of the ONU and is used for instructing the ONU to adjust bonded channels.

An embodiment of the present disclosure further provides a storage medium. Optionally, in the present embodiment, the storage medium may be configured to store program codes for performing the following steps.

Step S1, an optical network unit (ONU) reports to an optical line terminal (OLT) a channel bonding capability parameter supported by the ONU.

Step S2, the ONU receives a first bonding control information sent by the OLT which carries a channel bonding capability parameter of channels to be bonded of the ONU and is used for instructing the ONU to adjust bonded channels, wherein the channel bonding capability parameter of the channels to be bonded of the ONU is determined by the OLT according to the channel bonding capability parameter reported by the ONU and a service application and/or a data transmission state of the ONU.

Optionally, examples of the present embodiment may refer to the examples described in the above embodiments and the optional implementations, and will not be described repeatedly here.

Obviously, it should be appreciated for those skilled in the art that the above modules or steps of the present disclosure may be achieved by a general-purpose computing device, and may be aggregated to a single computing device or distributed over a network consisting of multiple computing devices. Optionally, they may be achieved by program codes executable by a computing device, and thereby they may be stored in a storage device and executed by a computing device. In some cases, the steps illustrated or described may be carried out in a sequence different from the described sequence here, or may be made into individual integrated circuit modules, or some of the modules or steps may be achieved by a single integrated circuit module. Accordingly, the present disclosure is not limited to any specific combination of hardware and software.

INDUSTRIAL APPLICABILITY

According to the embodiments of the present disclosure, the bonding of multiple optical channels between the OLT and the ONU is achieved flexibly by the cooperation between the OLT and the ONU according to a related channel bonding capability parameter and a service application and/or a data transmission state of the ONU, thereby solving the problem of the related art that the bonding performed simply on multiple physical channels may lead to large energy consumption.

What is claimed is:

1. A channel adjustment method, comprising:
   receiving, by an optical line terminal (OLT), a channel bonding capability parameter reported by an optical network unit (ONU), wherein the ONU supports the channel bonding capability parameter;
   determining, by the OLT, a channel bonding capability parameter of channels to be bonded of the ONU according to the received channel bonding capability parameter and a service application and/or a data transmission state of the ONU; and
   sending, by the OLT, to the ONU a first bonding control information for instructing the ONU to adjust bonded channels, wherein the first bonding control information carries the channel bonding capability parameter of the channels to be bonded of the ONU.

2. The method of claim 1, wherein the channel bonding capability parameter comprises at least one of: the number of the bonded channels, a wavelength of the bonded channels, and uplink and downlink rates of the channels.

3. The method of claim 1, wherein after sending, by the OLT, to the ONU the first bonding control information for instructing the ONU to adjust bonded channels, the method further comprises:
   receiving, by the OLT, a request reported by the ONU for instructing to change channels having been bonded;
   changing, by the OLT, the channels having been bonded according to the channel bonding capability parameter and the service application and/or the data transmission state of the ONU; and
   sending, by the OLT, to the ONU a second bonding control information for instructing the ONU to change bonded channels, wherein the second bonding control information carries a changed channel bonding capability parameter.

4. The method of claim 1, wherein after sending, by the OLT, to the ONU the first bonding control information for instructing the ONU to adjust bonded channels, the method further comprises:
   sending, by the OLT, to the ONU a request for instructing to change channels having been bonded;
   receiving, by the OLT, a message from the ONU for responding to the request, wherein the message for responding to the request indicates that the ONU confirms to perform an operation of changing the channels having been bonded;
   changing, by the OLT, the channels having been bonded according to the channel bonding capability parameter and the service application and/or the data transmission state of the ONU; and
   sending, by the OLT, to the ONU a third bonding control information for instructing the ONU to change bonded channels, wherein the third bonding control information carries a changed channel bonding capability parameter.

5. A channel adjustment method, comprising:
   reporting, by an optical network unit (ONU), to an optical line terminal (OLT) a channel bonding capability parameter supported by the ONU; and
   the ONU receiving, by the ONU, a first bonding control information sent by the OLT for instructing the ONU to adjust bonded channels, wherein the first bonding control information carries a channel bonding capability parameter of channels to be bonded of the ONU, and the channel bonding capability parameter of the channels to be bonded of the ONU is determined by the OLT according to the channel bonding capability parameter reported by the ONU and a service application and/or a data transmission state of the ONU.

6. The method of claim 5, wherein the channel bonding capability parameter comprises at least one of: the number of the bonded channels, a wavelength of the bonded channels, and uplink and downlink rates of the channels.

7. The method of claim 5, wherein after receiving, by the ONU, the first bonding control information sent by the OLT for instructing the ONU to adjust bonded channels, the method further comprises:
   reporting, by the ONU, to the OLT a request for instructing to change channels having been bonded; and
   receiving, by the ONU, a second bonding control information sent by the OLT for instructing the ONU to change bonded channels, wherein the second bonding control information carries a changed channel bonding capability parameter, and the changed channel bonding capability parameter is determined through the OLT changing the channels having been bonded according to the channel bonding capability parameter and the service application and/or the data transmission state of the ONU.

8. The method of claim 5, wherein after receiving, by the ONU, the first bonding control information sent by the OLT for instructing the ONU to adjust bonded channels, the method further comprises:
   receiving, by the ONU, a request sent by the OLT for instructing to change channels having been bonded;
   sending, by the ONU, a message to the OLT for responding to the request, wherein the message for responding to the request indicates that the ONU confirms to perform an operation of changing the channels having been bonded; and
   receiving, by the ONU, a third bonding control information sent by the OLT for instructing the ONU to change bonded channels, wherein the third bonding control information carries a changed channel bonding capability parameter, and the changed channel bonding capability parameter is determined through the OLT changing the channels having been bonded according to the channel bonding capability parameter and the service application and/or the data transmission state of the ONU.

9. A channel adjustment apparatus applied at an optical line terminal (OLT), comprising:
   a first receiving module configured to receive a channel bonding capability parameter reported by an optical network unit (ONU), wherein the ONU supports the channel bonding capability parameter;
   a determining module configured to determine a channel bonding capability parameter of channels to be bonded of the ONU according to the received channel bonding capability parameter and a service application and/or a data transmission state of the ONU; and
   a first sending module configured to send to the ONU a first bonding control information for instructing the ONU to adjust bonded channels, wherein the first bonding control information carries the channel bonding capability parameter of the channels to be bonded of the ONU.

10. The apparatus of claim 9, wherein the channel bonding capability parameter comprises at least one of: the number of the bonded channels, a wavelength of the bonded channels, and uplink and downlink rates of the channels.

11. The apparatus of claim 9, wherein,
   the first receiving module is further configured to receive, after the first sending module sends to the ONU the first bonding control information for instructing the ONU to adjust bonded channels, a request reported by the ONU for instructing to change channels having been bonded; and
   the apparatus further comprises a first processing module configured to change the channels having been bonded according to the channel bonding capability parameter and the service application and/or the data transmission state of the ONU, and send a second bonding control information to the ONU for instructing the ONU to change bonded channels, wherein the second bonding control information carries a changed channel bonding capability parameter.

12. The apparatus of claim 9, wherein,
   the first sending module is further configured to send, after sending to the ONU the first bonding control information for instructing the ONU to adjust bonded channels, a request to the ONU for instructing to change channels having been bonded;
   the first receiving module is further configured to receive a message from the ONU for responding to the request, wherein the message for responding to the request indicates that the ONU confirms to perform an operation of changing the channels having been bonded; and
   the apparatus further comprises a second processing module configured to change the channels having been bonded according to the channel bonding capability parameter and the service application and/or the data transmission state of the ONU, and send a third bonding control information to the ONU for instructing the ONU to change bonded channels, wherein the third bonding control information carries a changed channel bonding capability parameter.

13. A channel adjustment apparatus applied at an optical network unit (ONU), comprising:
   a first reporting module configured to report to an optical line terminal (OLT) a channel bonding capability parameter supported by the ONU; and
   a second receiving module configured to receive a first bonding control information sent by the OLT for instructing the ONU to adjust bonded channels, wherein the first bonding control information carries a channel bonding capability parameter of channels to be bonded of the ONU, and the channel bonding capability parameter of the channels to be bonded of the ONU is determined by the OLT according to the channel bonding capability parameter reported by the ONU and a service application and/or a data transmission state of the ONU.

14. The apparatus of claim 13, wherein the channel bonding capability parameter comprises at least one of: the number of the bonded channels, a wavelength of the bonded channels, and uplink and downlink rates of the channels.

15. The apparatus of claim 13, wherein,
   the first reporting module is further configured to report, after the second receiving module receives the first bonding control information sent by the OLT for instructing the ONU to adjust bonded channels, a request to the OLT for instructing to change channels having been bonded; and
   the second receiving module is further configured to receive a second bonding control information sent by the OLT for instructing the ONU to change bonded channels, wherein the second bonding control information carries a changed channel bonding capability parameter, and the changed channel bonding capability parameter is determined through the OLT changing the channels having been bonded according to the channel bonding capability parameter and the service application and/or the data transmission state of the ONU.

16. The apparatus of claim 13, wherein, the second receiving module is further configured to receive, after receiving the first bonding control information sent by the OLT for instructing the ONU to adjust bonded channels, a request sent by the OLT for instructing to change channels having been bonded;

the apparatus further comprises a second sending module configured to send a message to the OLT for responding to the request, wherein the message for responding to the request indicates that the ONU confirms to perform an operation of changing the channels having been bonded; and the second receiving module is further configured to receive a third bonding control information sent by the OLT for instructing the ONU to change bonded channels, wherein the third bonding control information carries a changed channel bonding capability parameter, and the changed channel bonding capability parameter is determined through the OLT changing the channels having been bonded according to the channel bonding capability parameter and the service application and/or the data transmission state of the ONU.

* * * * *